United States Patent [19]
Becker et al.

[11] Patent Number: 5,500,950
[45] Date of Patent: Mar. 19, 1996

[54] DATA PROCESSOR WITH SPECULATIVE DATA TRANSFER AND ADDRESS-FREE RETRY

[75] Inventors: Michael C. Becker; Charles R. Moore; John S. Muhich; Robert J. Reese, all of Austin, Tex.

[73] Assignee: Motorola, Inc., Schaumburg, Ill.

[21] Appl. No.: 11,024

[22] Filed: Jan. 29, 1993

[51] Int. Cl.⁶ .......................... G06F 12/00; G06F 13/00
[52] U.S. Cl. .......................... 395/445; 395/403; 395/495; 364/243.41; 364/955.1; 364/964.2; 364/DIG. 1; 371/37.2; 371/40.2
[58] Field of Search .................. 395/445, 495, 395/403; 364/243.41, 955.1, 964.2; 371/37.2, 40.2

[56] References Cited

U.S. PATENT DOCUMENTS

| | | | |
|---|---|---|---|
| 4,051,355 | 9/1977 | Lin | 235/302.3 |
| 4,493,026 | 1/1985 | Olnowich | 395/425 |
| 4,604,750 | 8/1986 | Manton et al. | 371/38 |
| 4,791,642 | 12/1988 | Taylor et al. | 371/38 |
| 4,845,614 | 7/1989 | Hanawa et al. | 395/425 |
| 5,210,867 | 5/1993 | Barlow et al. | 395/575 |
| 5,361,267 | 11/1994 | Godiwala et al. | 371/40.1 |

*Primary Examiner*—Tod R. Swann
*Assistant Examiner*—Frank J. Asta
*Attorney, Agent, or Firm*—Lee E. Chastain

[57] ABSTRACT

A data processor with speculative data transfer has address circuitry (40) and data circuitry (42, 44). The address circuitry generates a memory address associated with a data block and with a tag. The tag is representative of the validity of the data block. The data circuitry receives the data block associated with the memory address at a first time and receives a signal at a second subsequent time. The signal is representative of the validity of the data block. The data circuitry rejects the data block responsive to the signal. The data processor is able to receive data while the validity of the data is determined in parallel by, for instance, an address comparison or an error correcting code scheme.

13 Claims, 5 Drawing Sheets

DATA PROCESSOR WITH SPECULATIVE DATA TRANSFER AND ADDRESS-FREE RETRY

FIELD OF THE INVENTION

The present invention generally relates to digital computing systems, and more specifically to a data processor having a speculative data transfer mode.

BACKGROUND OF THE INVENTION

In many data processor applications, the validity of data stored in a particular memory location is determined by an associated tag. Therefore, for a particular data access to be successful, the tag associated with the requested data must fulfill a predetermined criteria. External memory caches and error correcting code (hereafter simply "ECC") memory systems are two data storage mechanisms in which the validity of data is determined by such a criteria.

An external memory cache is a relatively small, high speed memory system for supplying frequently used data to a data processor or other device. The data is periodically loaded from the data processing system's slower main memory into the external memory cache when time permits and as needed by the data processing system. The data is also periodically reloaded into the main memory from the external memory cache to free external cache memory locations for other data.

An external memory cache is characterized by its location in a particular system. An external memory cache is not located on the same integrated circuit or "chip" as is the data processor or other device to which the external memory cache supplies its data. Conversely, an external memory cache is a cache system located on a data processing unit to which the cache supplies its data. The external memory cache, however, may be the only cache associated with a data processing system. An external memory cache does not require an internal memory cache system to operate successfully.

Any cache is divided into a number of memory blocks and a corresponding number of "tags." Each memory block contains data that is useful to the operation of the data processor. Each tag is associated with one or a group of the memory blocks and contains data identifying the associated memory block or group of memory blocks. Typically the tag contains data representative of a portion of the main memory address from which the associated data block was loaded. Caches can store each data block in only one or a few particular cache storage elements. The storage elements are accessed through a subset of the main memory address bits of the dam. The ability to have storage elements indexed by the same address bit subset is known as "associativity." For instance, in a four-way associative cache, each memory address may be mapped to four locations in the cache. A direct-mapped memory cache is the degenerate cache case. In a direct-mapped memory cache each memory address may only be mapped into one cache storage element.

When a data processing system requests data from an external cache, the cache must access the one or more possible locations of the data block and compare the associated tag of each with a subset of the address of the requested block. If one of the tags matches the data address, then a "hit" occurs and the associated data of that tag is forwarded to the data processing system. If none of the tags match the memory address, then a "miss" occurs and the cache must access its main memory system to acquire the requested data.

Error correcting code memory systems are memory systems used when data integrity is critical. Financial transactions are a class of data processing operations in which data integrity is critical. There, an incorrect bit in a memory block may represent millions of dollars added or subtracted. ECC memory systems operate by associating a tag with each memory block. The data within each tag is calculated by performing a function on the associated data block when the data block is first stored into memory. The function may be recalculated each time the data block is retrieved from the memory and the result compared to the stored tag. If the result and the tag differ, then a memory error has occurred. In addition, most schemes allow certain errors to be corrected as well as detected. For instance, in one ECC memory scheme each 64-bit data block has an 8-bit tag associated with it. Each tag can detect single- and doublebit errors in an associated data block and may correct single-bit errors. The memory blocks with double-bit errors produce memory access errors.

Known external caches and known ECC memory systems incur a time penalty because of each system's tag comparison relative to a memory system without a tag. Each system must retrieve the requested data, make a tag comparison and then either forward the requested data based on the tag comparison or take some remedial action. As data processing systems become faster, all types of memory systems must become faster to avoid stalling the data processing system during data load operations.

SUMMARY OF THE INVENTION

In accordance with the present invention, there is disclosed a data processor having circuitry for speculatively transferring data and which substantially eliminates disadvantages of prior data processors.

A data processor with speculative data transfer has address circuitry and data circuitry. The address circuitry generates a memory address associated with a data block and with a tag. The tag is representative of the validity of the data block. The data circuitry receives the data block associated with the memory address at a first time and receives a signal at a second subsequent time. The signal is representative of the validity of the data block. The data circuitry selectively rejects the data block responsive to the signal.

A method of speculatively transferring data to a data processor has the steps of generating a plurality of address bits, receiving a data block and a periodic clocking signal at an input of the data processor, receiving a signal representative of the validity of the received data block at an input of the data processor and selectively discarding the received data block responsive to the received signal. The address bits are associated with a data block. The data block and periodic clocking signal are received at a first time. The signal representative of the validity of the received data block is received at a second time. The first and second times are adjacent cycles of the periodic clocking signal.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
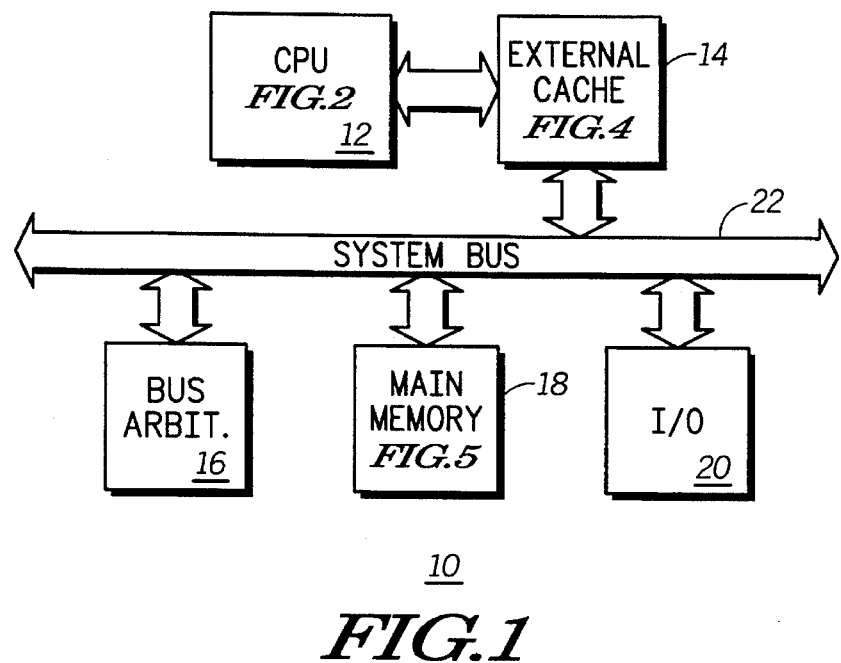
FIG. 1 depicts a block diagram of a data processing system constructed in accordance with the present invention.

FIG. 1 depicts a block diagram of a data processing system 10 constructed in accordance with the present invention. Data processing system 10 has a central processing unit 12 (hereafter simply "CPU" or "data processor"), an external cache 14 (labeled "EXT.$"), a bus arbitration unit 16, a main memory unit 18, an input/output unit 20 (hereafter simply "I/O unit") and a system bus 22. As depicted, external cache 14, bus arbitration unit 16, main memory 18 and I/O unit 20 are interconnected through system bus 22. CPU 12 is connected to system bus 22 through external cache 14. According to the present invention, data processing system 10 is able to speculatively load data from either external cache 14 or from main memory unit 18 thereby decreasing memory access times to these units relative to comparable units without the disclosed invention. Data is "speculatively loaded" when its validity is not known at the time it is transferred to CPU 12. The validity of the data may not be known pending, for instance, an address comparison or the result of an error correcting code function. The validating step may thereby be done in parallel with the data transfer step.

As will be described below, CPU 12 broadcasts an address to, inter alia, external cache 14 or main memory unit 18 when it needs a data block identified by, and associated with, the broadcast address. The appropriate unit will then retrieve the data and return it to CPU 12 via system bus 22. The appropriate unit will also indicate if the broadcast data block is valid in parallel with its data retrieval/broadcast step. The data may be invalid, in the case of data supplied by external cache 14, if a tag associated with the data block indicates that the data block was originally derived from a different address in main memory unit 18 than the address broadcast by CPU 12. In the case of main memory unit 18, a data block may be invalid if the main memory unit uses, for instance, an error correcting code (hereafter simply "ECC") scheme and that scheme indicates that a memory error occurred. In either case, the appropriate unit will broadcast a data retry signal to CPU 12 in the clock cycle immediately following the data block return to CPU 12. CPU 12 will disregard the previously received data block upon receipt of the data retry signal. The unit supplying the invalid data block may then return a valid data block to CPU 12 under certain circumstances.

One skilled in the art will be familiar with many of the functions of the blocks depicted in FIG. 1. In general, CPU 12 is a general purpose data processor that executes a series of instructions stored in main memory unit 18. External cache 14 contains a subset of the data stored in main memory unit 18 and provides it quickly to any unit that may request it, typically CPU 12. I/O unit 20 mutes data to and from various peripherals (not shown) to other units of data processing system 10 through system bus 22. These peripherals may include video displays, printers, communication networks, etc. Bus arbitration unit 16 allocates system bus 22 to those units that may request the use of the bus from time to time. Further functions of the units depicted in FIG. 1 that are necessary to practice the disclosed invention will be described below.

Figure 2:
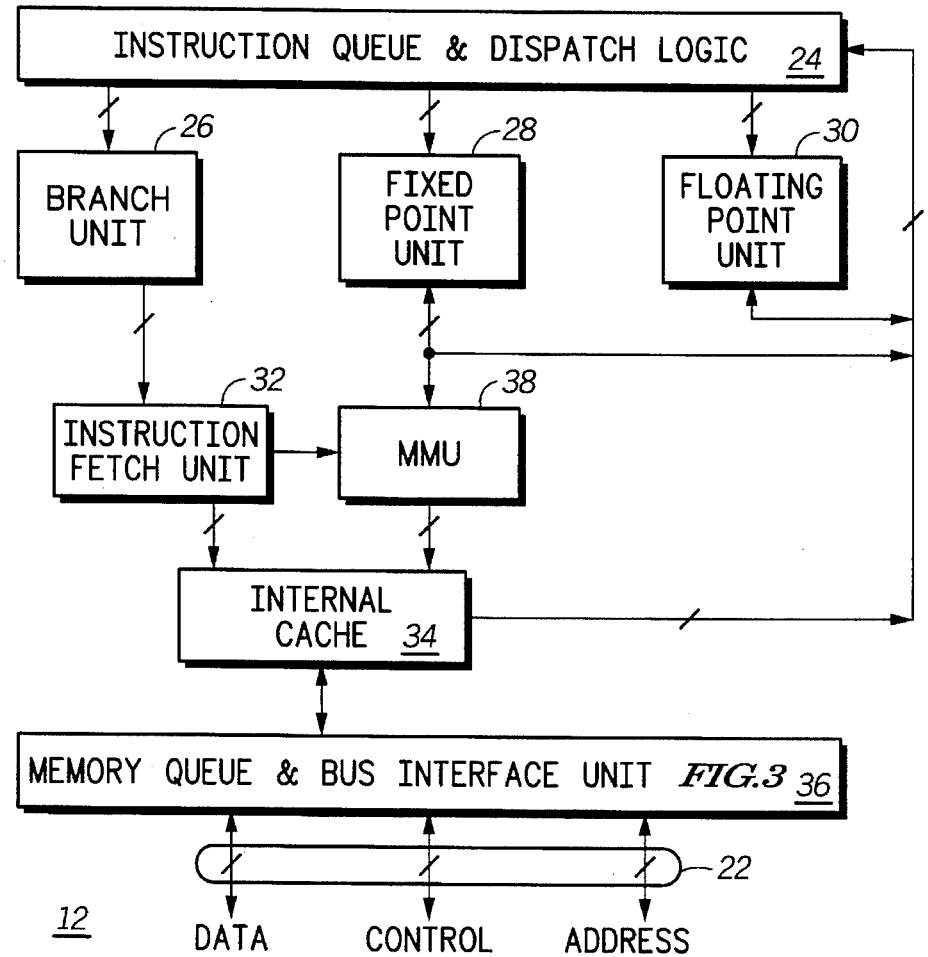
FIG. 2 depicts a block diagram of the central processing unit depicted in FIG. 1.

FIG. 2 depicts a block diagram of the central processing unit 12 depicted in FIG. 1. CPU 12 has an instruction queue and dispatch logic unit 24 that supplies instructions and operands to a branch instruction unit 26, a fixed point execution unit 28 and a floating point execution unit 30 (collectively the "execution units"). The output of branch instruction unit 26 is connected to the input of an instruction fetch unit 32. The output of instruction fetch unit 32 is connected to the input of an internal cache 34 (labeled "INTERNAL $"). An output of internal cache 34 and a second input are connected to a memory queue and bus interface unit 36. The output of fixed point execution unit 28 is connected to a memory management unit 38 (labeled and hereafter simply called "MMU"). The output of MMU 38 is connected to internal cache 34. Floating point execution unit 30 and internal cache 34 each generate an output that is connected to instruction queue and dispatch logic unit 24.

One skilled in the art will be familiar with many of the functions of the blocks depicted in FIG. 2. In general, instruction queue and dispatch logic unit 24 dispatches instructions and operands to the three execution units as appropriate given the particular type of instruction. Combined, the three execution units perform the assortment of instructions that CPU 12 is capable of performing. Branch execution unit 26 and instruction fetch unit 32 determine which instructions are to be executed during operation and cause internal cache 34 to forward the appropriate instructions to instruction queue and dispatch logic unit 24. Fixed point execution unit 28 handles fixed point instructions, memory load and memory store instructions. Floating point execution unit 30 handles all floating point instructions. Internal cache 34 is a high speed memory system that temporarily stores data and instructions from main memory 18. Internal cache 34 provides its data to instruction queue and dispatch logic unit 24. Memory queue and bus interface unit 36 cooperates with internal cache 34 to handle operations that require access to or from system bus 22. Memory queue and bus interface unit 36 is coupled to three groups of signals: DATA, CONTROL and ADDRESS. The signals labeled DATA and ADDRESS contain information identifying a particular data block and its corresponding location in memory. (The signals are also used to access and control devices other than memory systems.) The signals labeled CONTROL contain information identifying various control signals that implement the CPU's bus protocol. MMU 38 performs the virtual to real address translation for load instructions, for store instructions and for instruction fetches.

Figure 3:
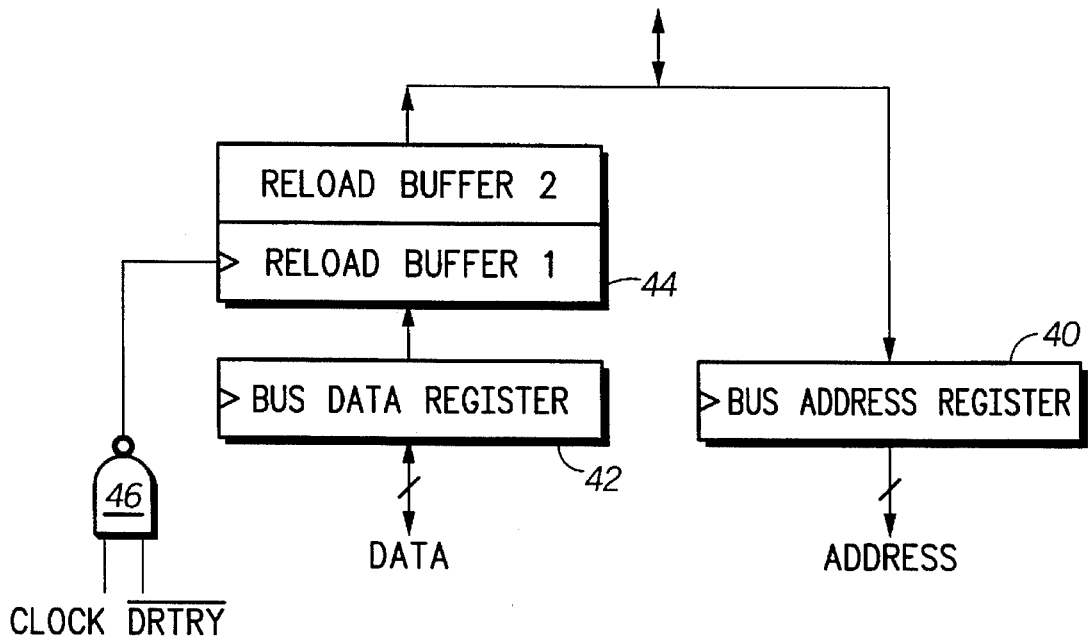
FIG. 3 depicts a block diagram of the memory queue and bus interface unit depicted in FIG. 2.

FIG. 3 depicts a block diagram of the memory queue and bus interface unit 36 depicted in FIG. 2. Memory queue and bus interface unit 36 has a bus address register 40 and a bus data register 42 for broadcasting an address request to and receiving a corresponding data block from system bus 22, respectively. Bus address register 40 and bus data register 42 are both clocked by a periodic clocking bus signal (indicated by the abbreviation ">"). The data flow through memory queue and bus interface unit 36 is pipelined to a reload buffer 44 before it is provided to internal cache 34. In the depicted embodiment, reload buffer 44 is two data blocks wide and internal cache 34 is only accessed when reload buffer 44 contains two valid data blocks. Memory queue and bus interface unit 36 thereby writes less frequently to internal cache 34 freeing internal cache 34 for other, more critical operations. Reload buffer 44 is clocked by the output of a NAND gate 46. The inputs to NAND gate 46 are connected to the bus clocking signal, "CLOCK," and to the data retry signal, "DRTRY."

In operation, data register 42 unconditionally latches a data block returned to CPU 12 by system bus 22 after bus address register 40 broadcasts the associated address. In the next clock cycle, the device that supplies the data block may invalidate the data block by asserting the signal $\overline{DRTRY}$. Reload buffer 44 will latch the data block present in bus data register 42 if the signal $\overline{DRTRY}$ is a logic high level (not asserted). If the signal $\overline{DRTRY}$ is a logic low level (asserted), then a data block stored in bus data register 42 will not be latched by reload buffer 44. Instead, the data block in bus data register 42 will be written over during the next bus clock cycle and the invalid data block will not be forwarded to reload buffer 44.

Figure 4:
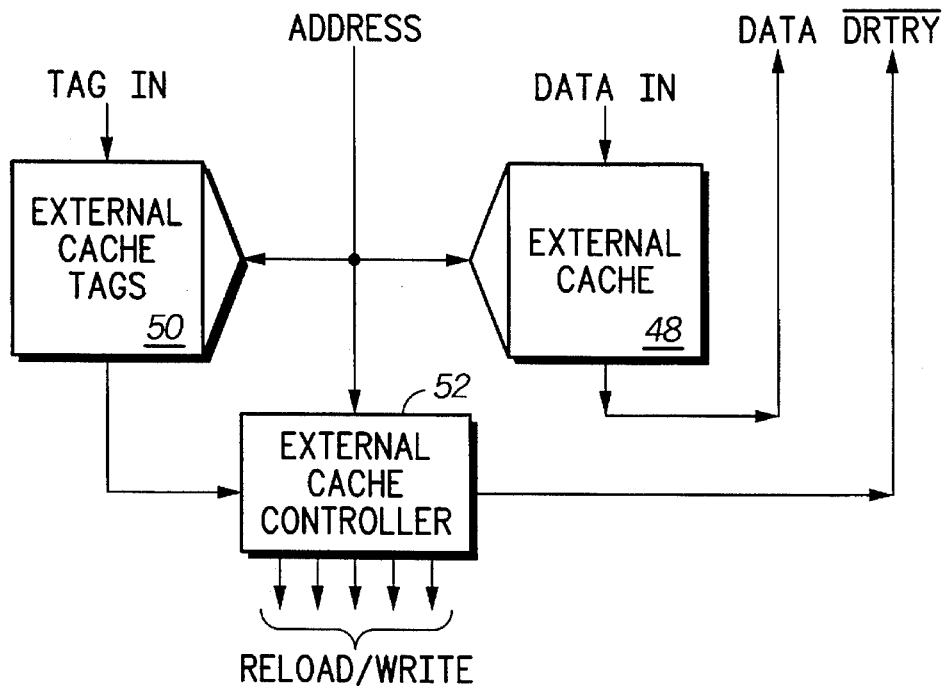
FIG. 4 depicts a block diagram of the second level memory cache depicted in FIG. 1.

FIG. 4 depicts a block diagram of external cache 14 depicted in FIG. 1. As described above, external cache 14 is not on the same integrated circuit as is CPU 12. External cache 14 has a first and a second bank of memory cells 48 and 50 for storing a plurality of data blocks and a plurality of associated tags, respectively. Each of memory banks 48 and 50 is connected to the signal ADDRESS. The signal ADDRESS is also connected to an external cache controller 52. External cache controller 52 generates the signal $\overline{DRTRY}$ and the signals labeled "RELOAD/WRITE."

Typically, first memory bank 48 is a bank of fast random access memory ("RAM") cells. At least one block of these cells and an associated tag from second memory bank 50 are simultaneously indexed using a subset of the address bits that make up the signal ADDRESS. The indexed data block or blocks may or may not contain the desired data depending upon previous cache operations. The number of indexed data block/tag pairs depends upon the degree of associativity of the cache. For instance, a direct mapped cache indexes only one data block/tag pair. A four-way associative cache will index four data block/tag pairs. The original address of the data block is therefore not uniquely determined by the address of the data block in the cache. The "original address" of a cache data block is the address in main memory from which the data block was originally derived. External cache controller 52 compares the contents of each indexed tag with the bits of the address that were not used to index the tag or tags. If the tag contents and the selected address bits match, then the associated data block is in fact the desired data. If the tag contents and the selected address bits do not match, then the associated data block is not the desired data. The contents of the associated tag combined with the location of the tag (or the data word) in the cache array uniquely identifies the original address of the associated data block.

In operation, external cache 14 receives an address of a data block desired by, for instance CPU 12. In the preferred embodiment, one data block and one associated tag are identified by a subset of the signal ADDRESS. One skilled in the art may readily extend the disclosed invention to cache implementations other than direct-mapped caches. The data block is then output on the signal DATA. In parallel, the contents of the associated tag are compared to the portion of the signal ADDRESS not used to address the data block and the tag. If the tag and remaining address bits are identical, then the data block already output is in fact the data block identified by the full signal ADDRESS. This is called a "cache hit." If the tag and remaining address bits are not identical, then the data block already output is not the data block identified by the full signal ADDRESS. This is called a "cache miss." External cache controller 52 detects the miss and asserts the signal $\overline{DRTRY}$ indicating that the output data block is invalid. Cache controller 52 may then generate RELOAD/WRITE signals that cause the desired data block to be loaded into external cache 14 from main memory 18. This data may then be forwarded to, for instance, CPU 12. The signal $\overline{DRTRY}$ is deasserted after the correct data is supplied to system bus 22. The signals RELOAD/WRITE may also be asserted by external cache 16 to write a data block to main memory 18 after external cache 16 has modified the data block.

Figure 5:
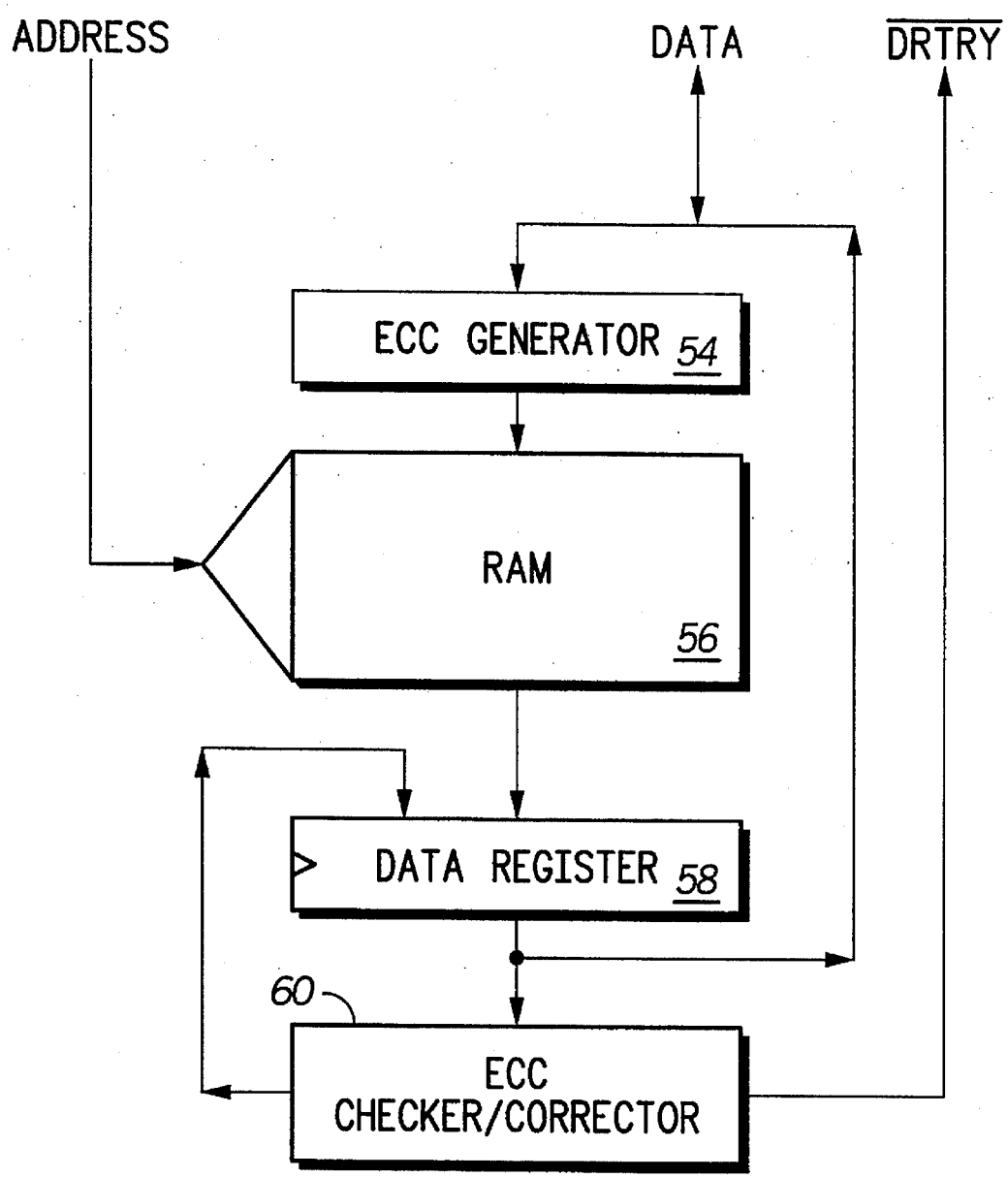
FIG. 5 depicts a block diagram of the main memory depicted in FIG. 1.

FIG. 5 depicts a block diagram of main memory 18 depicted in FIG. 1. Main memory 18 has an error correcting code generator 54 (error correcting code hereafter simply "ECC"), a block of RAM cells 56 for storing a plurality of data blocks and associated ECC tags, a data register 58 for receiving and storing the output of RAM 56 and an ECC checker/corrector 60. One skilled in the art will readily appreciate that FIG. 5 depicts a simplified main memory system. Several features not relevant to the present invention have been deleted to more clearly demonstrate the inventive concept. For instance, a main memory system will have READ and WRITE control signals to control what type of memory operation the main memory system performs.

In operation, CPU 12, for instance, supplies an address and associated data block to main memory 18 via the signals ADDRESS and DATA, respectively in a memory write operation. ECC generator 54 receives the data block, calculates an ECC function using the data block as its input, and forwards a "symbol" for storage to RAM 56. The symbol is the combination of the data block and the output of the ECC function. RAM 56 stores the symbol at the memory location indicated by the associated ADDRESS signal. Main memory 18 need not store the ECC result or tag with the original block. The tag must be stored somewhere for use in a later memory read operation.

In a memory read operation, CPU 12, for instance, supplies an address to RAM 56 of a data block that CPU 12 desires. RAM 56 outputs the data block and tag stored at the specified address to data register 58. Data Register 58 latches the data block and outputs it to external cache 14 on the signal DATA and to ECC checker/corrector 60. Data Register 58 also forwards the tag to ECC checker/corrector 60. ECC checker corrector 60 generates the same ECC function using the stored data block as its input. If the stored data block or tag somehow changed between the time the two were written to RAM 56 and the time the two are read from RAM 56, then the two ECC tags will differ. ECC checker/corrector 60 compares its ECC result with the previously stored tag. If the two tags differ, then a memory error has occurred and ECC checker/corrector 60 asserts the signal $\overline{DRTRY}$. As described above, the assertion of the signal $\overline{DRTRY}$ will cause CPU 12 to disregard the data block previously forwarded. If the two tags are the same, then a memory error has not occurred (or an unlikely, undetectable multi-bit error has occurred) and ECC checker/corrector 60 does not assert the signal $\overline{DRTRY}$. This parallel data forwarding/validating process forwards the data block to the requesting unit as quickly as possible while retaining data validation capability.

ECC checker/corrector 60 is able to correct the data block in certain ECC schemes. If ECC checker/corrector 60 is able to correct the data, then it will forward the corrected data to data register 58 and deassert the signal $\overline{\text{DRTRY}}$. The requesting device will then see the correct data block on the signal DATA.

Figure 6:
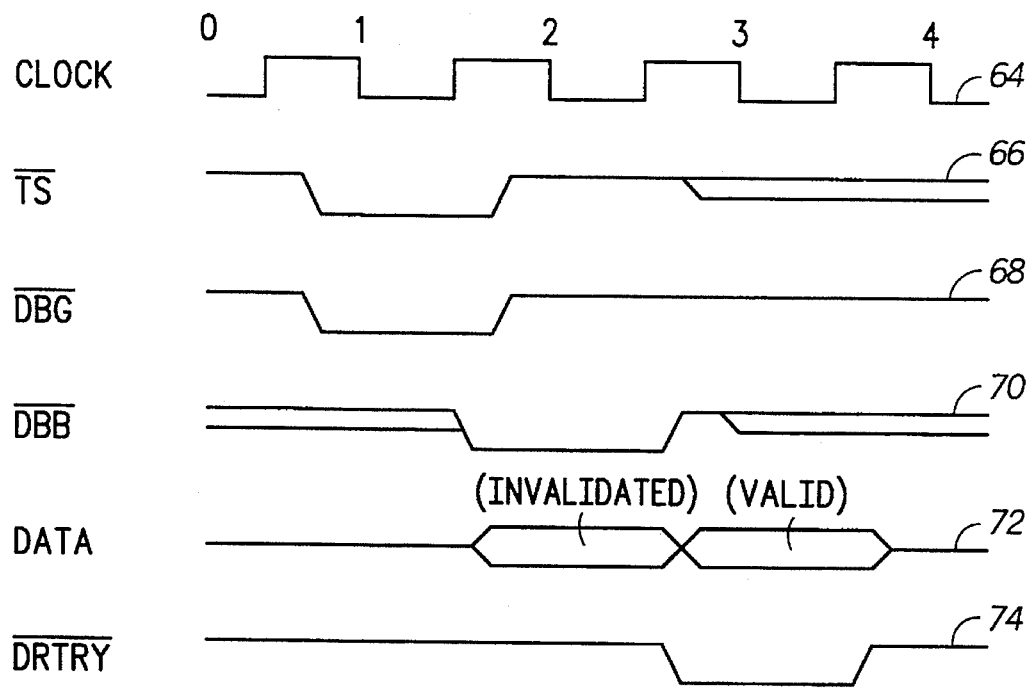
FIG. 6 depicts a timing diagram of a set of control signals operable to implement the disclosed invention according to a first mode of operation.

FIG. 6 depicts a timing diagram 62 of a set of control signals operable to implement the disclosed invention according to a first mode of operation. In particular, FIG. 6 depicts a single data block transaction. Timing diagram 62 depicts the variable time along the horizontal axis. Time may be conveniently measured by cycles of a periodic clock signal 64 labeled "CLOCK." Timing diagram 62 depicts five other signals with respect to the signal CLOCK: transaction start 66 labeled $\overline{\text{TS}}$, data bus granted 68 labeled $\overline{\text{DBG}}$, data bus busy 70 labeled $\overline{\text{DBB}}$, data 72 labeled DATA and data retry 74 labeled $\overline{\text{DRTRY}}$. The signals $\overline{\text{TS}}$ and $\overline{\text{DBB}}$ are bus signals that may be asserted by a number of different units in data processing system 10. These signals are therefore tri-state signals as indicated by the double parallel lines when in an inactive high logic state. It should be understood that the signal DATA will be N individual signals for a data path N-bits wide (N is an integer).

In operation, CPU 12 indicates that it needs the system bus 22 by asserting the signal $\overline{\text{TS}}$. Bus arbitration unit 16 grants system bus 22 to CPU 12 when system bus 22 is available by asserting the signal $\overline{\text{DBG}}$. In the present example, system bus 22 is available immediately. Bus arbitration unit 16 therefore asserts $\overline{\text{DBG}}$ during the first clock cycle. CPU 12 broadcasts its use of system bus 22 to data processing system 10 by asserting the signal $\overline{\text{DBB}}$ in the following clock cycle and continuing to assert $\overline{\text{DBB}}$ until CPU 12 is finished using system bus 22. The subsystem containing the selected data also transmits its data during the second clock cycle.

As indicated parenthetically in FIG. 6, the data block transmitted to CPU 12 during the second clock cycle is invalid. As described above, this data may be invalid because it is not the data associated with the desired address, because the data has an embedded error, or for some other reason. The subsystem supplying the data will assert the signal $\overline{\text{DRTRY}}$ causing CPU 12 to disregard the data broadcast in the previous cycle. The subsystem supplying the data will continue to assert the signal $\overline{\text{DRTRY}}$ until it is able to supply the correct dam. The subsystem will then deassert the signal $\overline{\text{DRTRY}}$ in the cycle immediately following the clock cycle in which the subsystem supplies the correct data. In the depicted example, the correct data is supplied immediately after the incorrect data is supplied, i.e. in the third clock cycle. The signal $\overline{\text{DRTRY}}$ is therefore deasserted in the fourth clock cycle.

Figure 7:
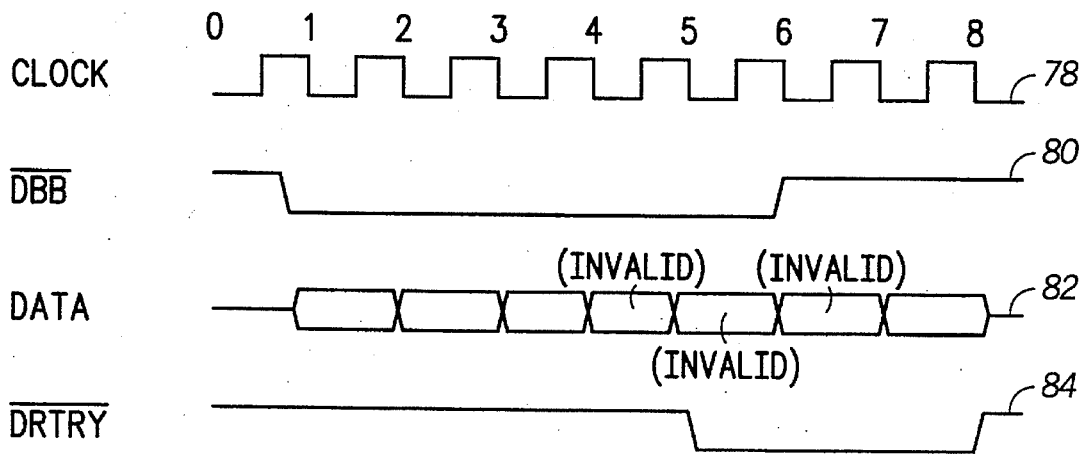
FIG. 7 depicts a timing diagram of a set of control signals operable to implement the disclosed invention according to a second mode of operation.

FIG. 7 depicts a timing diagram 76 of a set of control signals operable to implement the disclosed invention according to a second mode of operation. In particular, FIG. 7 depicts a four data block transaction or burst. Timing diagram 76 depicts the variable time along the horizontal axis. Time may be conveniently measured by cycles of a periodic clock signal 64 labeled "CLOCK." Timing diagram 76 depicts three other signals with respect to the signal CLOCK: data bus busy 80 labeled $\overline{\text{DBB}}$, data 82 labeled DATA and data retry 84 labeled $\overline{\text{DRTRY}}$. Two signals, $\overline{\text{TS}}$ and $\overline{\text{DBB}}$, are not depicted in FIG. 7. They are described above in connection with FIG. 6. It should be understood that the signal DATA will be N individual signals for a data path N-bits wide (N is an integer).

In a four-block data burst operation, the subsystem containing the selected data transmits four data blocks beginning the first clock cycle. As indicated parenthetically in FIG. 7, the fourth data block, transmitted to CPU 12 during the fourth clock cycle, is invalid. The disclosed invention, however, may be used to indicate that any one or more data blocks is invalid. The subsystem supplying the data asserts the signal $\overline{\text{DRTRY}}$ causing CPU 12 to disregard the data broadcast in the previous (fourth) cycle. The subsystem supplying the data continues to assert the signal $\overline{\text{DRTRY}}$ until it is able to supply the correct data. In the depicted example, the correct data is supplied in the seventh clock cycle. The signal $\overline{\text{DRTRY}}$ is therefore deasserted in the eighth clock cycle. In general, the appropriate subsystem may assert $\overline{\text{DRTRY}}$ in the (n+1)th clock cycle whenever an invalid data block is broadcast to CPU 12 in the nth clock cycle (n is an integer).

Figure 8:
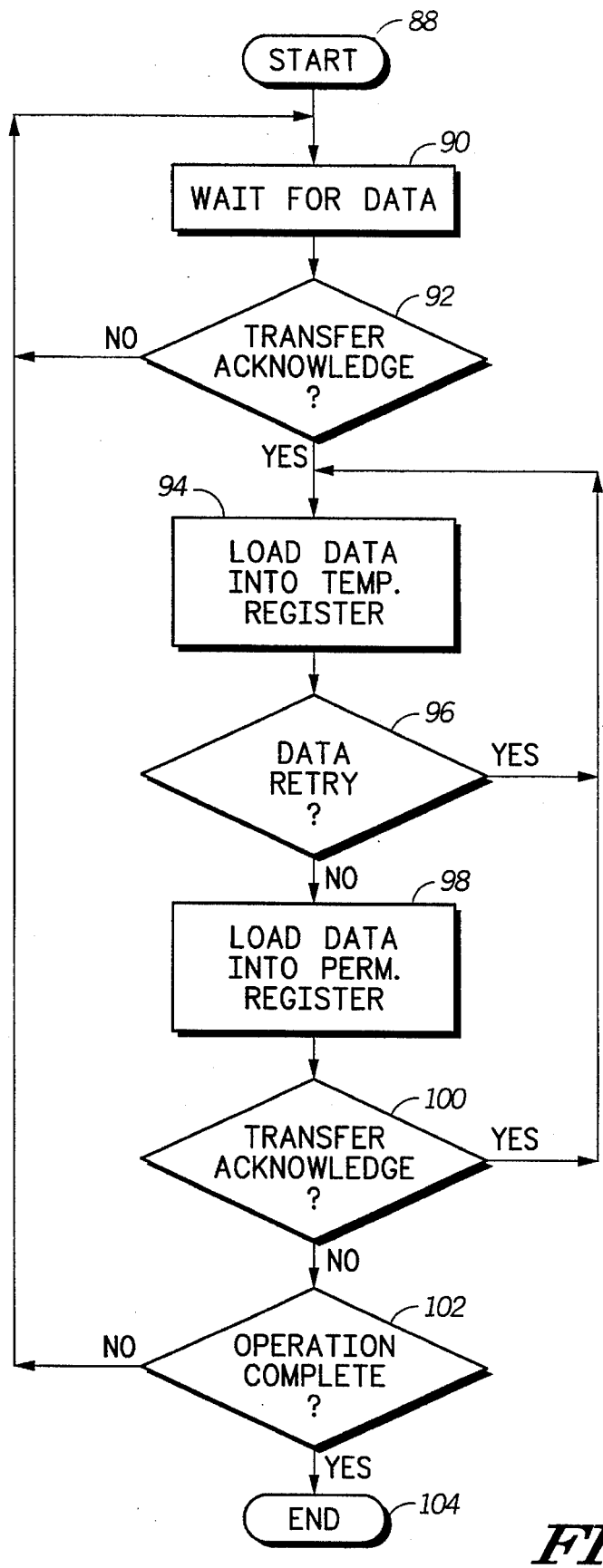
FIG. 8 depicts a flow chart of one set of steps operable to implement the timing diagrams depicted in FIGS. 6 and 7.

FIG. 8 depicts a flow chart 86 of one set of steps operable to implement the timing diagrams depicted in FIGS. 6 and 7. The steps depicted in FIG. 8 are executed by the device receiving the speculative data. In the example used above, CPU 12 executes the steps depicted in FIG. 8.

Flow chart 86 begins at step 88 where CPU 12 acquires control of system bus 22 and issues an address to a memory location. CPU 12 then waits for data to be returned to it by the subsystem managing the requested data block, step 90. Eventually CPU 12 will receive a data block through system bus 22. Typically, each data block must be accompanied by a transfer acknowledge signal, step 92. The transfer acknowledge signal indicates that the relevant system has put a data block onto system bus 22. If the transfer acknowledge signal is not present, then flow chart 86 branches to step 90 to await further data and a proper transfer acknowledge signal.

CPU 12 loads the received data block into bus data register 42 when the transfer acknowledge signal is correct, step 94. During the subsequent clock signal, the signal $\overline{\text{DRTRY}}$ may be asserted by the subsystem supplying the requested data block, step 96. If the signal $\overline{\text{DRTRY}}$ is asserted, then flow chart 86 branches to step 94 where CPU 12 will continue to load and flush the data block present on system bus 22 until the data block is valid and the signal $\overline{\text{DRTRY}}$ is not asserted. CPU 12 will load the received data block into reload buffer 44 once the signal $\overline{\text{DRTRY}}$ is not asserted, step 98.

In step 100 CPU 12 branches to step 94 to load an additional data block into bus data register 42 if the signal transfer acknowledge is asserted. If the signal transfer acknowledge is not asserted, then flow chart 86 falls through to step 102. In step 102, CPU 12 determines if all requested data blocks have been received. If CPU 12 receives all data blocks, then flow chart 86 ends, step 104. If CPU does not receive all requested data blocks, then flow chart 86 branches to step 90 where CPU 12 waits for another data block, etc.

Although the present invention has been described with reference to a specific embodiment, further modifications and improvements will occur to those skilled in the art. For instance, the particular units of CPU 12 that perform each of the disclosed functions of CPU 12 are arbitrary. The various functions may be performed by different units or by a combination of units and operate equally well. Also, the validity of a data block may be determined by schemes other than address comparison and ECC schemes. A data processor might use a simple parity check against a stored parity bit (a tag) to ensure data integrity. It is to be understood therefore, that the invention encompasses all such modifications that do not depart from the spirit and scope of the invention as defined in the appended claims.

What is claimed is:

1. A data processor with speculative data transfer comprising:
   address circuitry for generating a memory address and transmitting the memory address to an external memory system, the memory address indexing a data block and a tag; and
   data circuitry for receiving the data block indexed by the memory address at a first time and for receiving a first signal and a second signal at a second subsequent time, the first signal representative of the validity or invalidity of the data block, the data circuitry selectively rejecting the data block responsive to the first signal, the data circuitry receiving the data block at a third time subsequent to the first time responsive to the second signal without retransmitting the memory address to the external memory system.

2. The data processor of claim 1 wherein the data circuitry further comprises:
   a first latch for receiving and storing the data block at a first time; and
   a second latch coupled to the first latch, the second latch receiving the data block at a second subsequent time responsive to the first signal.

3. A data processing system comprising:
   a data processor comprising:
      address circuitry for generating a memory address and transmitting the memory address to a memory circuitry, the memory address indexing a data block and a tag;
      data circuitry for receiving the data block indexed by the memory address at a first time and for receiving a first signal and a second signal at a second subsequent time, the first signal representative of the validity or invalidity of the data block, the data circuitry selectively rejecting the data block responsive to the first signal, the data circuitry receiving the data block at a third time subsequent to the first time responsive to the second signal without retransmitting the memory address to the external memory system;
   the memory circuit coupled to the address circuitry and to the data circuitry, the memory circuitry comprising:
      storage circuitry for retrieving the data block and the tag responsive to the data processor; and
      tag comparison circuitry for generating the first signal responsive to the associated tag retrieved by the storage circuitry.

4. The data processing system of claim 3 wherein the tag comparison circuitry comprises an external cache controller that compares the associated tag to a subset of address bits of the memory address.

5. The data processing system of claim 4 wherein the data circuitry further comprises:
   a first latch for receiving and storing the data block at a first time; and
   a second latch coupled to the first latch, the second latch receiving the data block at a second subsequent time responsive to the first signal.

6. The data processing system of claim 3 wherein the tag comparison circuitry comprises error correcting code circuitry for generating an error correcting code function.

7. The data processing system of claim 6 wherein the data circuitry further comprises:
   a first latch for receiving and storing the data block at a first time; and
   a second latch coupled to the first latch, the second latch receiving the data block at a second subsequent time responsive to the first signal.

8. A method of speculatively transferring data to a data processor comprising the steps of:
   generating a plurality of address bits in a data processor, the address bits associated with a data block;
   transmitting the plurality of address bits to an external device; at a first time, receiving the data block from the external device at an input of the data processor;
   storing the received data block in the data processor;
   at a second subsequent time, receiving a first signal and a second signal from the external device at an input of the data processor, the first signal representative of the validity or invalidity of the received data block at an input of the data processor,
   discarding the received data block responsive to the first signal; and;
   at a third time subsequent to the second time, receiving the data block from the external device responsive to the second signal without transmitting the plurality of address bits to the external device.

9. A method of transferring data within a data processing system comprising the steps of:
   generating a plurality of address bits in a data processor, the address bits associated with a data block;
   transmitting the plurality of address bits to a memory device;
   at a first time, receiving the data block from the memory device at an input of the data processor;
   storing the received data block in the data processor;
   comparing a tag indexed by the plurality of address bits to a predetermined value;
   at a second time subsequent to the first time, receiving a first signal and a second signal at the input of the data processor from the memory device, the first signal representative of the validity or invalidity of the received data block;
   discarding the received data block responsive to the first signal;
   at a third time subsequent to the second time, receiving the data block at the input of the data processor from the memory device responsive to the second signal without retransmitting the plurality of address bits to the memory device.

10. The method of claim 9 wherein the step of comparing comprises generating an error correcting code function from the data block.

11. The method of claim 10 wherein the step of discarding comprises latching or not latching the data block in a register responsive to the first signal.

12. The method of claim 9 wherein the step of comparing comprises comparing the tag to a subset of the plurality of address bits.

13. The method of claim 12 wherein the step of discarding comprises latching or not latching the data block in a register responsive to the first signal.

* * * * *